United States Patent
Fornes et al.

(10) Patent No.: US 12,215,253 B2
(45) Date of Patent: Feb. 4, 2025

(54) METHODS AND SYSTEMS FOR REDUCING ADHESIVE STRENGTH AND ASSOCIATED PULL-OFF STRESSES

(71) Applicant: LORD Corporation, Cary, NC (US)

(72) Inventors: Timothy Fornes, Apex, NC (US); Anurodh Tripathi, Morrisville, NC (US); Michael Shane Thompson, Raleigh, NC (US)

(73) Assignee: LORD Corporation, Cary, NC (US)

( * ) Notice: Subject to any disclaimer, the term of this patent is extended or adjusted under 35 U.S.C. 154(b) by 197 days.

(21) Appl. No.: 17/631,329

(22) PCT Filed: Jul. 31, 2020

(86) PCT No.: PCT/US2020/044432
§ 371 (c)(1),
(2) Date: Jan. 28, 2022

(87) PCT Pub. No.: WO2021/022125
PCT Pub. Date: Feb. 4, 2021

(65) Prior Publication Data
US 2022/0315803 A1    Oct. 6, 2022

Related U.S. Application Data

(60) Provisional application No. 62/880,701, filed on Jul. 31, 2019.

(51) Int. Cl.
*C09J 5/04* (2006.01)
*F16B 11/00* (2006.01)
(Continued)

(52) U.S. Cl.
CPC ............ *C09J 5/04* (2013.01); *F16B 11/006* (2013.01); *H01M 10/613* (2015.04);
(Continued)

(58) Field of Classification Search
CPC . F16B 11/006; H01M 10/625; C09J 2203/33; C09J 2301/208
See application file for complete search history.

(56) References Cited

U.S. PATENT DOCUMENTS

| | | | | |
|---|---|---|---|---|
| 2014/0212637 A1* | 7/2014 | Syvret | ........................ | B32B 7/12 156/60 |
| 2015/0299521 A1* | 10/2015 | Bossaert | .................. | C08L 61/04 428/305.5 |
| 2017/0274623 A1* | 9/2017 | Sherman | ................ | B32B 27/365 |

FOREIGN PATENT DOCUMENTS

| | | | |
|---|---|---|---|
| EP | 0 725 378 A1 | 8/1996 | |
| EP | 1 724 320 A1 | 11/2006 | |

(Continued)

OTHER PUBLICATIONS

International Search Report and Written Opinion for Application No. PCT/US2020/044432 dated Oct. 15, 2020.
(Continued)

*Primary Examiner* — Daniel McNally
(74) *Attorney, Agent, or Firm* — KDW FIRM PLLC

(57) ABSTRACT

Methods and systems for adhesively bonding a first substrate to a second substrate to reduce pull-off stress during separation of the first and second substrates include applying a first adhesive to a first bonding region of a bonding area of the first substrate, applying a second adhesive, which has an adhesive strength that is lower than an adhesive strength of the first adhesive, to a second bonding region of the bonding area of the first substrate, pressing the first and second substrates against each other to form an adhesive bondline, and curing the first and second adhesives for a predetermined period of time to form a cured adhesive bondline between the first and second substrates.

48 Claims, 7 Drawing Sheets

(51) Int. Cl.
    *H01M 10/613* (2014.01)
    *H01M 10/625* (2014.01)
    *H01M 10/653* (2014.01)
    *H01M 10/6554* (2014.01)

(52) U.S. Cl.
    CPC ....... *H01M 10/625* (2015.04); *H01M 10/653* (2015.04); *H01M 10/6554* (2015.04); *C09J 2203/33* (2013.01); *C09J 2301/208* (2020.08); *C09J 2301/502* (2020.08); *H01M 2220/20* (2013.01)

(56) References Cited

FOREIGN PATENT DOCUMENTS

| EP | 2 463 347 A2 | 6/2012 |
|---|---|---|
| JP | 5480383 B2 | 4/2014 |
| JP | 2014072445 A | 4/2014 |
| WO | WO 2016/131741 A1 | 8/2016 |

OTHER PUBLICATIONS

Japanese Office Action for Application No. 2022505587 dated Feb. 21, 2023.
Chinese Office Action for Application No. 2020800549099 dated Feb. 1, 2024.
European Office Action for Application No. 207577487 dated Feb. 28, 2024.
Chinese Office Action for Application No. 2020800549099, dated Nov. 12, 2024, 12 pages.

\* cited by examiner

|  | PULL-OFF STRESS (MPa) | 95% CONFIDENCE (MPa) | FAILURE MODE |
|---|---|---|---|
| FIRST EXAMPLE SC-1500 SPECIMEN | 0.24 | 0.012 | TLC |
| SECOND EXAMPLE SC-1500 SPECIMEN | 0.005 | 0.0033 | COH |
| THIRD EXAMPLE SC-1500 SPECIMEN | 0.003 | 0.0013 | COH |
| FOURTH EXAMPLE SC-1500 SPECIMEN | 0.14 | 0.031 | MAINLY TLC |
| FIFTH EXAMPLE SC-1500 SPECIMEN | 0.12 | 0.054 | 50% TLC + 50% COH |
| SIXTH EXAMPLE SC-1500 SPECIMEN | 0.46 | 0.126 | TLC |

FIG. 5

PER+R:H (1:2)

METHODS AND SYSTEMS FOR REDUCING ADHESIVE STRENGTH AND ASSOCIATED PULL-OFF STRESSES

CROSS-REFERENCE TO RELATED APPLICATION

This is a National Stage Application filed under 35 U.S.C. 371 based on International Patent Application No. PCT/US2020/044432, filed on Jul. 31, 2020, which claims priority to U.S. Provisional Patent Application Ser. No. 62/880,701, which was filed on Jul. 31, 2019, the disclosure of which is incorporated by reference herein in its entirety.

FIELD OF INVENTION

The subject matter disclosed herein relates to methods and systems for reducing pull-off stress of adhesively bound substrates.

BACKGROUND

The removal of adhesively bound substrates generally requires use of solvents, heat, and/or large mechanical forces. However, certain applications such as battery assemblies in electronic vehicles do not allow use of such approaches either due to design constraints (e.g., inaccessible bond lines) and/or safety considerations (e.g., physical deformation and/or damage to battery assemblies and/or battery cells within such battery assemblies). In fact, the presently utilized techniques for removal of adhesive from surfaces of battery assemblies are known to irreversibly damage such battery assemblies in at least some instances. In the case of semi-conductor applications, adhesive or thermal interface materials prohibit the service of parts, e.g. silicon die or microprocessor, due the propensity for damage due to the high strength of the adhesive. Moreover, such adhesive often lacks the low modulus needed to absorb stresses and reduce part warping due to differences in coefficient of thermal expansion between the adhesive/TIM and the substrates. In addition, the performance requirements of certain applications require the use of toxic adhesives such as traditional isocyanate containing urethane adhesives. The limited serviceability/reworkability, performance, and/or toxicity of such adhesively bound substrates, such as are commonly utilized in battery assemblies, clearly demonstrates an urgent need for a safe and practical method of reducing pull-off stresses induced during separation of adhesively-bonded surfaces.

SUMMARY

The presently disclosed subject matter comprises a method that reduces pull-off stresses (e.g., the stresses induced during separation of two adhesively bonded substrates, which directly correlates to adhesive strength) by at least 20% relative to conventionally known methods, while also passing environmental cycling, introducing no changes in design of the assembly and minimal if any changes in adhesive formulations. In some embodiments, the method is capable of reducing pull-off stresses during separation of two adhesively bonded substrates by, for example, at least 25%, at least 50%, at least 75%, or more than 80%. Moreover, the method is deployable using existing industrial settings.

In an example embodiment, a method for adhesively bonding a first substrate to a second substrate to reduce pull-off stress during separation of the first and second substrates is provided, the method comprising: applying a first adhesive to a first bonding region of a bonding area of the first substrate; applying a second adhesive, which has an adhesive strength that is lower than an adhesive strength of the first adhesive, to a second bonding region of the bonding area of the first substrate; pressing the first substrate against the second substrate; and forming an adhesive bondline comprising the first and second adhesives between the first and second substrates.

In some embodiments, the adhesive bondline is formed by curing, at least partially, the first and/or second adhesives for a predetermined period of time.

In some embodiments of the method, the first bonding region of the bonding area is a perimeter of the bonding area; and the second bonding region of the bonding area is located within, and bounded by, the perimeter formed by the first bonding region, such that the second adhesive at least partially fills a volume within the perimeter.

In some embodiments of the method, the second adhesive completely fills the volume between the first and second substrates in the second bonding region.

In some embodiments of the method, the first adhesive forms a continuous and uninterrupted layer around the perimeter of the bonding area.

In some embodiments of the method, the second bonding region of the bonding area is a perimeter of the bonding area; and the first bonding region of the bonding area is located within, and bounded by, the perimeter formed by the second bonding region, such that the first adhesive at least partially fills a volume within the perimeter.

In some embodiments of the method, the first adhesive completely fills the volume between the first and second substrates in the first bonding region.

In some embodiments of the method, the second adhesive forms a continuous and uninterrupted layer around the perimeter of the bonding area.

In some embodiments of the method, the first and second adhesives comprise a same two-part adhesive formulation; and the first adhesive has a R:H (resin to hardener) ratio that is different from the second adhesive.

In some embodiments of the method, the first adhesive has a greater degree of crosslinking than the second adhesive.

In some embodiments of the method, wherein the second adhesive comprises an uncrosslinked material.

In some embodiments of the method, the greater degree of crosslinking is due to the R:H ratio being different for the first and second adhesives In some embodiments of the method, the R:H ratio of the first adhesive comprises a relatively greater proportion of hardener than the R:H ratio of the second adhesive, which comprises a relatively greater proportion of resin than the R:H ratio of the first adhesive.

In some embodiments of the method, at least one of the first adhesive and the second adhesive comprise at least one of a urethane, silicone, acrylic, and epoxy-based material.

In some embodiments of the method, the first substrate comprises a heat source and the second substrate comprises a heat sink; or the second substrate comprises a heat source and the first substrate comprises a heat sink.

In some embodiments of the method, the heat source comprises a battery module and/or the heat sink comprises a cooling plate.

In some embodiments of the method, the battery module is configured to supply power to an electric vehicle.

In some embodiments of the method, the heat source comprises a microprocessor and the heat sink comprises a lid and/or heat spreader.

In some embodiments of the method, at least one of the first adhesive and the second adhesive comprise a thermally conductive filled resin composition.

In some embodiments of the method, at least one of the first adhesive and the second adhesive comprise a thermally conductive gap filler adhesive.

In some embodiments, the method comprises separating the first substrate from the second substrate by breaking the adhesive bondline formed by the first and second adhesives, wherein, due to the lower adhesive strength of the second adhesive, a pull-off stress required to separate the first and second substrates is less than a pull off stress that would be needed to separate the first and second substrates if an entirety of the bonding area were covered by the first adhesive.

In some embodiments of the method, the adhesive strength of the first and second adhesives is correlated (e.g., directly correlated) to the pull-off stress required to separate the first substrate from the second substrate.

In some embodiments, the method comprises irradiating at least a portion of the first adhesive with a light source comprising ultraviolet (UV) light to depolymerize at least the portion of the first adhesive that is exposed to the light source, such that the adhesive strength of the first adhesive decreases, relative to the adhesive strength of the first adhesive prior to exposure to the light source.

In some embodiments, the method comprises, after the first and/or second adhesives have been cured, exposing the first and second adhesives to a temperature above a predetermined softening temperature to decrease the adhesive strength of at least the first adhesive, wherein one of the first and second substrates comprises a heat source, and wherein the softening temperature is within an operating temperature of the heat source.

In some embodiments, the adhesive in at least the first bonding region is an adhesive that is cured by irradiation with ultraviolet light.

In some embodiments of the method, the adhesive in the first bonding region and the adhesive in the second bonding region have comparable adhesive strengths but, when mixed together (e.g., at a region between the first and second bonding regions), will cause the adhesives to have lower or higher adhesive strength.

In some embodiments of the method, the pull-off stress over the entire bonding area is reduced by at least 50% relative to a pull-off stress that would prevail if a single adhesive were applied over the same area (e.g., over both the first and second bonding regions).

In some embodiments of the method, the adhesive in the first bonding area and the adhesive in the second bonding area are different one-part or two-part adhesives (e.g., gap fillers).

In some embodiments of the method, the adhesive in the first and/or second bonding regions is configured to swell when a solvent is applied (e.g., directly applied) thereto.

In another example embodiment, a system for adhesively bonding a first substrate to a second substrate to reduce pull-off stress during separation of the first and second substrates is provided, the system comprising: a first adhesive applied over a first bonding region of a bonding area of the first substrate; and a second adhesive, which has an adhesive strength that is lower than an adhesive strength of the first adhesive, applied over a second bonding region of the bonding area of the first substrate; wherein the system is configured such that the first and second substrates are pressed against each other to form an adhesive bondline comprising the first and second adhesives between the first and second substrates.

In some embodiments, the adhesive bondline is formed by curing, at least partially, the first and/or second adhesives for a predetermined period of time.

In some embodiments of the system, the first bonding region of the bonding area is a perimeter of the bonding area; and the second bonding region of the bonding area is located within, and bounded by, the perimeter formed by the first bonding region, such that the second adhesive at least partially fills a volume within the perimeter.

In some embodiments of the system, the second adhesive completely fills the volume between the first and second substrates in the second bonding region.

In some embodiments of the system, the first adhesive forms a continuous and uninterrupted layer around the perimeter of the bonding area.

In some embodiments of the system, the second bonding region of the bonding area is a perimeter of the bonding area; and the first bonding region of the bonding area is located within, and bounded by, the perimeter formed by the second bonding region, such that the first adhesive at least partially fills a volume within the perimeter.

In some embodiments of the system, the first adhesive completely fills the volume between the first and second substrates in the first bonding region.

In some embodiments of the system, the second adhesive forms a continuous and uninterrupted layer around the perimeter of the bonding area.

In some embodiments of the system, the first and second adhesives comprise a same two-part adhesive formulation; and the first adhesive has a R:H (resin to hardener) ratio that is different from the second adhesive.

In some embodiments of the system, the first adhesive has a greater degree of crosslinking than the second adhesive.

In some embodiments of the system, the second adhesive comprises an uncrosslinked material.

In some embodiments of the system, the greater degree of crosslinking is due to the R:H ratio being different for the first and second adhesives.

In some embodiments of the system, the R:H ratio of the first adhesive comprises a relatively greater proportion of hardener than the R:H ratio of the second adhesive, which comprises a relatively greater proportion of resin than the R:H ratio of the first adhesive.

In some embodiments of the system, at least one of the first adhesive and the second adhesive comprise at least one of a urethane, silicone, acrylic, and epoxy-based material.

In some embodiments of the system, the first substrate comprises a heat source and the second substrate comprises a heat sink; or the second substrate comprises a heat source and the first substrate comprises a heat sink.

In some embodiments of the system, the heat source comprises a battery module and/or the heat sink comprises a cooling plate.

In some embodiments of the system, the battery module is configured to supply power to an electric vehicle.

In some embodiments of the system, the heat source comprises a microprocessor and the heat sink comprises a lid and/or heat spreader.

In some embodiments of the system, at least one of the first adhesive and the second adhesive comprise a thermally conductive filled resin composition.

In some embodiments of the system, at least one of the first adhesive and the second adhesive comprise a thermally conductive gap filler adhesive.

In some embodiments of the system, the system is configured for separating the first substrate from the second substrate by breaking the adhesive bondline formed by the first and second adhesives; and due to the lower adhesive strength of the second adhesive, a pull-off stress required to separate the first and second substrates is less than a pull off stress that would be needed to separate the first and second substrates if an entirety of the bonding area were covered by the first adhesive.

In some embodiments of the system, the adhesive strength of the first and second adhesives is correlated to the pull-off stress required to separate the first substrate from the second substrate.

In some embodiments of the system, at least a portion of the first adhesive is configured, upon being irradiated with a light source comprising ultraviolet (UV) light, to depolymerize at least the portion of the first adhesive that is exposed to the light source, such that the adhesive strength of the first adhesive decreases, relative to the adhesive strength of the first adhesive prior to exposure to the light source.

In some embodiments of the system, the system is configured, after the first and/or second adhesives have been cured, when exposed to a temperature above a predetermined softening temperature, to decrease the adhesive strength of at least the first adhesive; one of the first and second substrates comprises a heat source; and the softening temperature is within an operating temperature of the heat source.

In some embodiments of the system, the adhesive in the first bonding region and the adhesive in the second bonding region have comparable adhesive strengths but, when mixed together (e.g., at a region between the first and second bonding regions), will cause the adhesives to have lower or higher adhesive strength.

In some embodiments of the system, the pull-off stress over the entire bonding area is reduced by at least 50% relative to a pull-off stress that would prevail if a single adhesive were applied over the same area (e.g., over both the first and second bonding regions).

In some embodiments of the system, the adhesive in the first bonding area and the adhesive in the second bonding area are different one-part or two-part adhesives (e.g., gap fillers).

In some embodiments of the system, the adhesive in the first and/or second bonding regions is configured to swell when a solvent is applied (e.g., directly applied) thereto.

In another example embodiment, a method for adhesively bonding a first substrate to a second substrate to reduce pull-off stress during separation of the first and second substrates is provided, the method comprising: applying a first adhesive to a bonding area of the first substrate; applying a second adhesive to the bonding area of the first substrate; pressing the first substrate against the second substrate; and forming an adhesive bondline comprising the first and second adhesives between the first and second substrates, wherein an adhesive strength of the adhesive bondline is lower than an adhesive strength of an adhesive bondline formed entirely from only the first adhesive or only the second adhesive.

In some embodiments of the method, the first and second adhesives have a substantially similar adhesive strength.

In some embodiments of the method, the first and second adhesives are mixed together, at least partially, when the first substrate is pressed against the second substrate.

In some embodiments, the method comprises separating the first substrate from the second substrate by breaking the adhesive bondline formed by the first and second adhesives, wherein, since the adhesive strength of the adhesive bondline is lower than an adhesive strength of an adhesive bondline formed entirely from only the first adhesive or only the second adhesive, a pull-off stress required to separate the first and second substrates is less than a pull-off stress that would be needed to separate the first and second substrates if an entirety of the bonding area were covered by only the first adhesive or only the second adhesive.

In another example embodiment, a system for adhesively bonding a first substrate to a second substrate to reduce pull-off stress during separation of the first and second substrates is provided, the system comprising: a first adhesive applied over a bonding area of the first substrate; and a second adhesive applied over the bonding area of the first substrate; wherein the system is configured such that, when the first and second substrates are pressed against each other, an adhesive bondline comprising the first and second adhesives is formed between the first and second substrates; and wherein an adhesive strength of the adhesive bondline is lower than an adhesive strength of an adhesive bondline formed entirely from only the first adhesive or only the second adhesive.

In some embodiments of the system, the first and second adhesives have a substantially similar adhesive strength.

In some embodiments of the system, the first and second adhesives are mixed together, at least partially, when the first substrate is pressed against the second substrate.

In some embodiments of the system, the system is configured for separating the first substrate from the second substrate by breaking the adhesive bondline formed by the first and second adhesives; and since the adhesive strength of the adhesive bondline is lower than an adhesive strength of an adhesive bondline formed entirely from only the first adhesive or only the second adhesive, a pull-off stress required to separate the first and second substrates is less than a pull-off stress that would be needed to separate the first and second substrates if an entirety of the bonding area were covered by only the first adhesive or only the second adhesive.

As used herein, the word "adhesive" can be used to refer to a crosslinked or uncrosslinked material used to mechanically and/or thermally join (e.g., connect, such as being in direct contact with each of) at least two substrates. As such, any and all "adhesives" referred to herein can include, but are not necessarily limited to, any of bonding agents, compounds, and/or materials; bonding agents, compounds, and/or materials; thermosetting agents, compounds, and/or materials; adhesive agents, compounds, materials, and/or composites; thermoplastic agents, compounds, and/or materials; hotmelt adhesive agents, compounds, and/or materials; mating agents, compounds, and/or materials; structural adhesive agents, compounds, and/or materials; sealant agents, compounds, and/or materials; adhesive films; interface materials; interfacial pads; and greases. The foregoing list further includes thermally conductive versions of each. As used herein, the term "thermally conductive" refers to a substance that has a thermal conductivity of at least 1.0 Watts per meter-Kelvin (W/mK), and preferably at least 2.0 W/mK, at least 3.0 W/mK, at least 4.0 W/mK, at least 5.0 W/mK, or at least 6.0 W/mK, by way of example and without limitation. Furthermore, the term "thermally conductive" does not include materials that a person having ordinary skill in the art would conclude to be a thermal insulator (e.g., commonly used to maintain a temperature gradient by inhibiting heat transfer).

As used herein, the terms "resin" and "hardener" are used to refer to subcomponents of a two-part system (e.g., a two-part material or compound, which can be an adhesive), in which the mixing of the subcomponents allows the two-part system to cure.

As used herein, the term gap filler is intended as an adhesive that fills a gap between two or more substrates to be bonded together and also forms an adhesive bond between the two or more substrates, however, in some instances the terms "gap filler" and "adhesive" may be used interchangeably herein.

The example methods and systems disclosed herein greatly reduce damage to battery assemblies during service, while also enabling reliable thermal performance in-use, as compared to conventional, non-patterned (e.g., having a continuous R:H ratio across the cross-section of the adhesive bondline) thermally conductive adhesives. Although demonstrated herein with silicone-based gap fillers, the example methods disclosed herein are applicable to alternative gap filler chemistries, such as urethanes (polyol/isocyanate), epoxies, and the like. In an embodiment of the present invention, the method disclosed herein comprise using any 2-part adhesive for the first and second adhesives by using a different ratio of the two parts in the adhesive applied in a first bonding region of the bonding area than in the adhesive applied in a second bonding region of the bonding area.

BRIEF DESCRIPTION OF THE DRAWINGS

FIG. 5 is a table showing the results of empirical testing for measuring pull-off stresses for various formulations and/or arrangements of adhesive materials.

DETAILED DESCRIPTION

Figure 1:
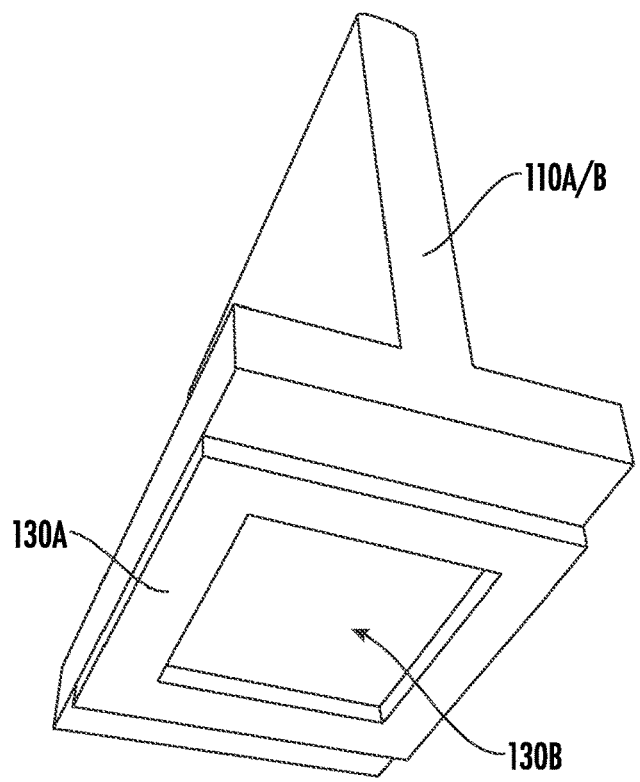
FIG. 1 is a perspective view of an adhesive applied over a surface of a T-bar structure.

In a first example embodiment disclosed herein, a method is provided for forming an adhesive bond between at least two substrates that, when the substrates are separated from each other, reduces the pull-off stress (e.g., defined as removal force divided by bonded surface area) required to separate the substrates. The method comprises adhesively bonding the substrates over a bonding area, in which a first bonding region has a first adhesive that is different from a second adhesive applied over a second bonding region, the second adhesive in the second bonding region having a lower adhesive strength than the adhesive strength of the first adhesive in the first bonding region. As used herein, adhesive strength is correlated (e.g., directly) with the pull-off force required to separate adhesively bonded substrates, meaning that an adhesive having an increased adhesive strength will require a greater pull-off force to separate the adhesively bonded substrates than would be necessary to separate substrates bonded with an adhesive having a lower adhesive strength. In some embodiments, the first and second adhesives are comprised of the same constituent components, but are mixed at a different ratio. In some embodiments, the first and second adhesives are different adhesives and have different chemical and/or molecular compositions.

The first adhesive is applied to and/or over (e.g., directly to) the first bonding region of the bonding area of the first substrate. The second adhesive is applied to and/or over (e.g., directly to) the second bonding region of the bonding area of the first substrate. The first and second bonding regions can, in total, be the same as, or less than, the total surface area of the bonding area of the first substrate and/or the second substrate. In some embodiments, the first adhesive is applied to the first bonding region before the second adhesive is applied to the second bonding region. In some embodiments, the second adhesive is applied to the second bonding region before the first adhesive is applied to the first bonding region.

The second adhesive, while having a lower adhesive strength than the first adhesive, provides sufficient adhesion to maintain contact between the substrates and also to substantially fill (e.g., at least 75% or more, at least 80% or more, at least 90% or more, at least 95% or more, or at least 99% or more) the portion of the volume between the substrates corresponding to the second bonding region, over which the second adhesive is applied. The combined adhesive strength of the first and second adhesives provides sufficient adhesive strength to maintain an adhesive bond between the two substrates when the bonded substrates are subjected to (e.g., receive as inputs during use) mechanical and environmental effects.

In some embodiments, the first and second adhesives can be applied to different substrates, such that, for example, the first adhesive is applied on and/or over a first bonding region on the first substrate or the second substrate and the second adhesive is applied on and/or over the second bonding region of whichever of the second substrate or the first substrate the first adhesive is not applied.

In some embodiments, the first and second adhesives comprise the same two-part adhesive formulation, but are mixed at different ratios of resin (R) to hardener (H). As used herein, the term "two-part adhesive formulation" means that the first and second adhesives each use the same resin and the same hardener, but that the R:H ratio in the first adhesive is different from the R:H ratio in the second adhesive. By using a different R:H ratio in the first and second adhesives, the adhesive strength of the first and second adhesives is different due to a difference in the degree of cure or crosslinking provided by the resin/hardener interaction in the first and second adhesives. The adhesive strength of the first adhesive and/or the second adhesive can be altered by altering the R:H ratio thereof.

In some embodiments, the first and second adhesives comprise substantially different adhesive formulations tailored to provide predetermined adhesive strengths based on the application. As such, the first and second adhesives can, for example, use different curable resins, hardeners, fillers, and the like, or may contain different relative proportions of any of the curable resins, hardeners, fillers, and the like in each different adhesive formulation.

The pattern of the first and second adhesives, as applied over the respective first and second bonding region, between the two substrates to be bonded, may vary from those illustrated herein without deviating from the scope of the subject matter disclosed herein. In the example embodiment shown herein, the bonding region is defined about a perimeter of the bonding area, which is the surface area over which the substrates are to be bonded together and the second bonding region is defined within (e.g., concentrically within) the first bonding region to fill, either partially, or substantially entirely, the volume defined within the perimeter formed from the first adhesive. The composite adhesive strength (e.g., the total adhesive strength of the adhesive bond between the substrates) of the adhesive bond formed from the first and second adhesives can be increased or decreased by applying relatively more or less of the first and second adhesives (e.g., by altering the relative proportions of the first and second bonding regions of the bonding area). For example, the composite adhesive strength can be increased by increasing the proportion of the first bonding region, over which the first adhesive is applied. The composite adhesive strength can be decreased by decreasing the proportion of the first bonding region, over which the first adhesive is applied. When the proportion of the first bonding region, over which the first adhesive is applied, increases to increase the adhesive strength, the proportion of the second bonding region, over which the second adhesive is applied, either decreases or, in instances in which the second adhesive does not entirely fill the space defined within the perimeter formed by the first adhesive, can remain the same. When the proportion of the first bonding region, over which the first adhesive is applied, decreases to reduce the adhesive strength, the proportion of the second bonded region, over which the second adhesive is applied, can either remain the same or can increase to fill a greater proportion of the second bonding region, which is defined within the perimeter formed by the first adhesive.

In another example embodiment, the second bonding region is defined about a perimeter of the bonding area, which is the surface area over which the substrates are to be bonded together and the first bonding region is defined within (e.g., concentrically within) the second bonding region to fill, either partially, or substantially entirely, the volume defined within the perimeter formed from the second adhesive (e.g., which has a lower adhesive strength than the first adhesive). The composite adhesive strength (e.g., the total adhesive strength of the adhesive bond between the substrates) of the adhesive bond formed from the first and second adhesives can be increased or decreased by applying relatively more or less of the first and second adhesives (e.g., by altering the relative proportions of the first and second bonding regions of the bonding area). For example, the composite adhesive strength can be increased by increasing the proportion of the first bonding region (e.g., the interior portion of the bonding area, within the perimeter formed by the second adhesive), over which the first adhesive is applied. The composite adhesive strength can be decreased by decreasing the proportion of the first bonding region (e.g., the interior portion of the bonding area, within the perimeter formed by the second adhesive), over which the first adhesive is applied.

In some embodiments of the method, the first substrate comprises a heat source (e.g., a battery assembly, battery pack, or the like) and the second substrate comprises a heat sink (e.g., a cooling plate, or other suitable heat-dissipating structure) requiring a thermally conductive adhesive (e.g., a gap filler or other suitable thermal interface material) therebetween to transfer heat from the heat source to the heat sink. In an example embodiment, the first substrate comprises a battery module, which is adhesively bonded to the second substrate, which comprises a cooling plate, via a 2-part, thermally conductive (TC) gap filler adhesive material. Another example embodiment can comprise a semiconductor application, in which a microprocessor is adhered to a protective, heat-spreading lid or a proactive, heat-spreading lid adhered to a heat sink.

In some embodiments of the method, the adhesives applied in the first and second bonding regions may be selected to enable the adhesive applied over the second bonding region (e.g., within the perimeter formed by the adhesive applied over the first bonding region) to fail. In a cohesive manner. In some embodiments, the adhesive applied over the second bonding region can be selected to fail in an adhesive manner.

In some embodiments, the method is capable of effectuating a reduction in removal, or separation, stress (e.g., corresponding to a reduction in pull-off force) compared to conventional methods by varying (e.g., in a step-wise manner) the R:H ratio of the adhesive throughout a cross-section of the bonding area to a create a first bonding region containing adhesive with an R:H ratio that is well-cross-linked relative to second bonding region, which contains adhesive with an R:H ratio that is comparatively lightly crosslinked. The adhesive, while having different adhesive strength in the first and second bonding regions due to the variance of the R:H ratio throughout a cross-section of the bonding area, retains its ability to transfer heat between the battery module and the cooling plate and also to prevent separation of the battery module and the cooling plate during typical operation.

In some embodiments of the method, the adhesive can be a one-part or two-part adhesive by differentially curing different portions of the adhesive due to two different adhesive formulations being applied within the first and second bonding regions of the bonding area, with one adhesive formulation providing a higher adhesive strength and/or stress and being applied over the first bonding region and the second adhesive formulation providing a lower adhesive strength and/or stress and being applied over the second bonding region.

In some embodiments, the adhesive applied over the second bonding region comprises a phase change material or a thermally conductive gap pad.

In some embodiments, the method comprises applying an adhesive-release agent to at least a portion of (e.g., a second bonding region, as described elsewhere herein) the bonding area of at least one of the substrates (e.g., a battery module and/or a cooling plate), prior to the application of any adhesive thereto (e.g., to the portion of the bonding area to which the adhesive-release agent has been, or is to be, applied). The application of the adhesive-release agent to at least the second bonding region of the bonding area of at least one of the substrates reduces the adhesive retention force between the adhesive and the substrate to which the adhesive-release agent is applied, at least in the portion of the bonding area in and/or over which the adhesive-release agent is applied. In some embodiments, the method comprises applying the adhesive release agent by patterning the adhesive-release agent onto a portion of (e.g., the second bonding portion of) the bonding area of the substrate where lower a reduced bonding force (e.g., relative to a an adhesive bond in which no adhesive-release agent is applied) and, hence, a reduced pull-off force and/or stress, is desired to form an area of low pull off stress within the bonding area. In some embodiments, the method comprises selecting and applying a release agent over at least a portion of the bonding area (e.g., over some or all of the first bonding region and/or over some or all of the second bonding region), the release agent preferentially causing the degree of crosslinking within the adhesive applied within the portion of the bonding area over which the release agent is applied to be enhanced and/or compromised, depending on the chemical composition of the adhesive(s) in contact with the release agent and the chemical composition of the release agent applied.

In some embodiments, the method comprises applying a first adhesive, in the form of a one-part or two-part adhesive formulation, in a first bonding region (e.g., around a perimeter) of the bonding area on one of two substrates to be bonded together, the first adhesive providing high adhesive strength and/or stress and requiring correspondingly high pull-off force and/or stress for separation of the substrates after the first adhesive has been cured. The method comprises applying a second adhesive, in the form of, for example, an uncured thermoplastic, in a second bonding region (e.g., within the perimeter formed by first adhesive in the first bonding region) of the bonding area, the second adhesive providing a lower adhesive strength and/or stress than is provided by the cured first adhesive and, therefore, requiring correspondingly lower pull-off force and/or stress for separation of the substrates than if the first adhesive were applied over the portion of the bonding area in which the second adhesive is applied.

In some embodiments, the first and second adhesives are a same or a different adhesive that can be, for example, uncrosslinked (e.g., a thermoplastic material). According to such embodiments, such uncrosslinked adhesives can be applied using, for example, heat or by application of a solvent. In some such embodiments, one or more solvent-borne thermoplastic materials are applied (e.g., dispensed) within the first and/or second bonding regions of the bonding area of a first substrate (e.g., a heat source, such as a battery module). In some embodiments, different solvent-borne thermoplastic materials are applied in the first and second bonding regions. After the solvent-borne thermoplastic material(s) is/are applied over the bonding area, the solvent-borne thermoplastic material(s) is/are dried and the first substrate is positioned against (e.g., by pressing and/or clamping) the second substrate (e.g., a heatsink, such as a cooling plate), such that the solvent-borne thermoplastic material(s) is/are in contact (e.g., direct contact) with the second substrate. Once the solvent-borne thermoplastic material(s) is/are in contact with the second substrate, the solvent-borne thermoplastic material(s) is/are heated (e.g., by applying heat to the second substrate), such that the solvent-borne thermoplastic material(s) is/are wetted over (e.g., to form a conformal coating over) the portion of the second substrate that is in contact with the solvent-borne thermoplastic material(s).

In some embodiments, the method comprises applying a first adhesive, in the form of a one-part or two-part adhesive formulation, in and/or over a first bonding region of (e.g., about a perimeter of) the bonding area to provide high adhesive strength and/or stress, and which requires correspondingly high pull-off force and/or stress for separation of the substrates after the first adhesive has been cured, the high adhesive strength and/or stress provided by the first adhesive being configured so as to decrease when the first adhesive is exposed to a temperature above a predetermined temperature threshold. The method also comprises applying a second adhesive, in the form of a lightly or un-crosslinked adhesive material, in and/or over a second bonding region of (e.g., within an interior formed by the first bonding region of) the bonding area. As such, the first adhesive applied about the perimeter of the bonding area may have a dramatically lower (e.g., by 50% or more, by 75% or more) adhesive strength when exposed to a temperature above the predetermined temperature threshold, this thermally-induced reduction in adhesive strength being advantageous in further aiding in disassembly of the adhesive bondline, at least relative to the pull-off stress induced when separating the substrates without preheating the first adhesive above the predetermined temperature threshold. In some such embodiments, the predetermined temperature threshold is a temperature at which adhesive strength of the first adhesive is dramatically reduced (e.g., by 50% or more, by 75% or more) over the first bonding region of (e.g., about the perimeter of) the bonding area, yet this predetermined temperature threshold is below the upper use temperature limit of the components being adhesively bonded together, for example, in a battery module. In some embodiments, the adhesive strength of one or both of the adhesives may be decreased by altering a pH of the adhesive, applying a solvent, irradiation with light or sound, and the like.

In some embodiments, the method comprises applying a first adhesive, in the form of a one-part or two-part adhesive formulation, in and/or over a first bonding region of (e.g., about a perimeter of) the bonding area to provide high adhesive strength and/or stress, and which requires correspondingly high pull-off force and/or stress for separation of the substrates after the first adhesive has been cured. According to this embodiment, the first adhesive may be configured to undergo a depolymerization process when exposed portions of the first bonding region (e.g., the externally visible portions of the first adhesive about a perimeter of the bonding area) are subjected directly to ultraviolet (UV) light. As used herein, the term "subjected directly to" can mean that a device that outputs UV light is arranged such that UV light from the device is directed towards, and incident upon (e.g., illuminates and/or irradiates), the exposed portions of the first adhesive in the first bonding region. As such, according to this example method, the adhesive strength of the first adhesive over at least a portion of the first bonding region of the bonding area is dramatically reduced (e.g., by 50% or more, by 75% or more) through UV-induced depolymerization, thereby further aiding in disassembly of the bondline during separation of the substrates. This example embodiment further include applying a second adhesive, in the form of a comparatively less well-crosslinked, or un-crosslinked, adhesive material, over at least a second bonding region of (e.g., within an interior region of the bonding area formed within a perimeter defined by the first bonding region), such that the second adhesive provides a lower adhesive strength and/or stress and requires a corresponding lower pull-off force and/or stress to separate the substrates at the adhesive bondline.

In another embodiment of the present invention, the method comprises applying a one-part, UV-curable adhesive over the first bonding region of the bonding area, applying a second adhesive over the second bonding region of the bonding area, pressing the substrates against each other to form the adhesive bondline, and exposing the perimeter to UV light to polymerize the UV-curable adhesive.

In some embodiments, the method comprises applying a first adhesive, in the form of a one-part or two-part adhesive formulation, which is applied about a perimeter of the bonding area to provide high adhesive strength and/or stress, and which requires correspondingly high pull-off force and/or stress, for separation of the substrates when the first adhesive is cured. According to this embodiment, a second adhesive, in the form of a thermally conductive, pre-cured gap pad, is applied over at least a portion of the bonding surface within the perimeter formed by the first adhesive, such that the second adhesive provides a lower adhesive strength and/or stress and requires a corresponding lower pull-off force and/or stress to separate the substrates at the adhesive bondline.

According to the methods disclosed herein, the pull-off stress over the entire bonding area is reduced by at least 20% (e.g, by 20% or more, 30% or more, 40% or more, 50% or more 75% or more, 90% or more) as compared to the pull-off stress required to separate substrates at an adhesive bondline formed over a same bonding area, but which has an adhesive with an R:H ratio that is the same as the R:H ratio of the first adhesive, applied in the portions of the bonding area in which the first and second adhesives are applied instead in the methods disclosed herein.

Figure 3:
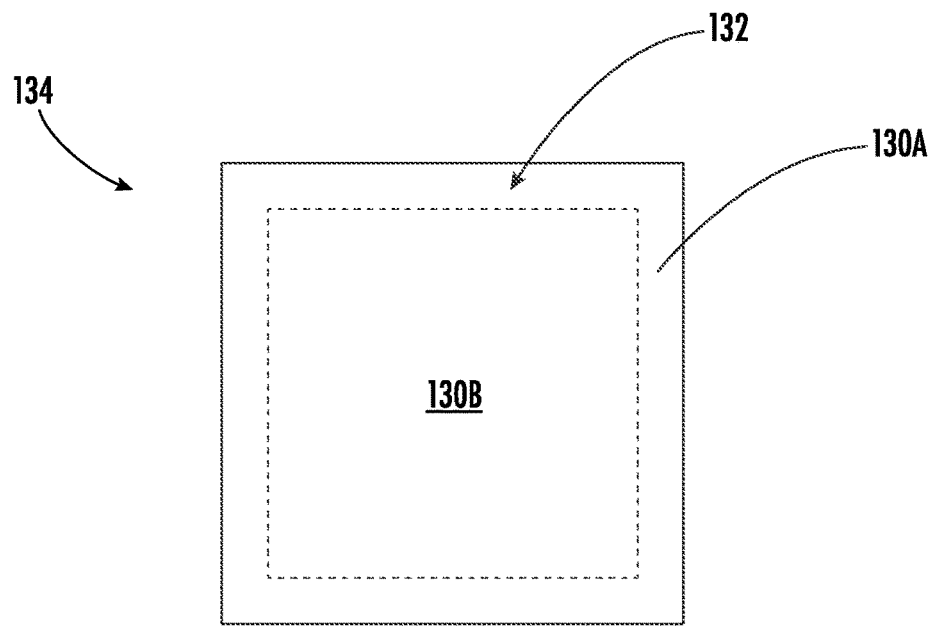
FIG. 3 is a schematic illustration of a bonding area having first and second bonding regions defined therein.

In some embodiments, by using a same adhesive in the first and second bonding regions but by using different R:H ratios, a variable crosslink density and, correspondingly, a variable adhesive strength from the exterior to the interior of the bonding area is produced, while still maintaining a highly thermally conductive bondline. It can be advantageous to use adhesives in the first and second bonding regions that are of the same base chemistry and are compatible with one another, as this can result in a favorable interaction at the intersection (see, e.g., 132, FIG. 3) between the first and second bond regions.

FIGS. 1-8 show various aspects of a testing apparatus 100 and/or results used to validate the efficacy of the methods disclosed herein. The testing apparatus 100, example aspects of which are shown in FIGS. 1-4, is used to measure tensile pull-off stress required to separate aluminum substrates (e.g., T-bar structures 110A, 110B) that are adhesively bonded together by, in the example embodiments disclosed herein, a thermally conductive adhesive gap filler 130. The aluminum substrates used in the example embodiments disclosed herein correspond to the structures present in a battery module-cooling plate assembly prevalent in many electric vehicle (EV) applications. In evaluating the efficacy of the methods disclosed herein using the testing apparatus 100 shown in FIGS. 1-4, the resin-to-hardener ratio (R:H ratio) of the adhesive gap filler is systematically varied in different regions of the adhesive bonding area (see, e.g., FIG. 3). As shown and used in the example figures, the term "Perimeter" (Per) is used to designate the first bonding region and the term "Center" is used to designate the second bonding region, which is bounded by the perimeter of the bonding area formed by the first bonding region.

In the testing apparatus of FIGS. 1-4, an adhesive was applied over a bonding area 134 on one of two T-bar structures 110A, 110B. To form a repeatable adhesive bondline of 1.0 mm, a spacer 140 having a thickness of 1.0 mm is positioned between the surface of each T-bar structure 110A, 110B, the spacers 140 being positioned on opposite ends of the area of the T-bar structures 110A, 110B (e.g., along the length direction of the T-bar structures 110A, 110B) to prevent the T-bar structures 110A, 110B from compressing the adhesive within the bonding area 134 thinner than 1.0 mm.

Figure 2:
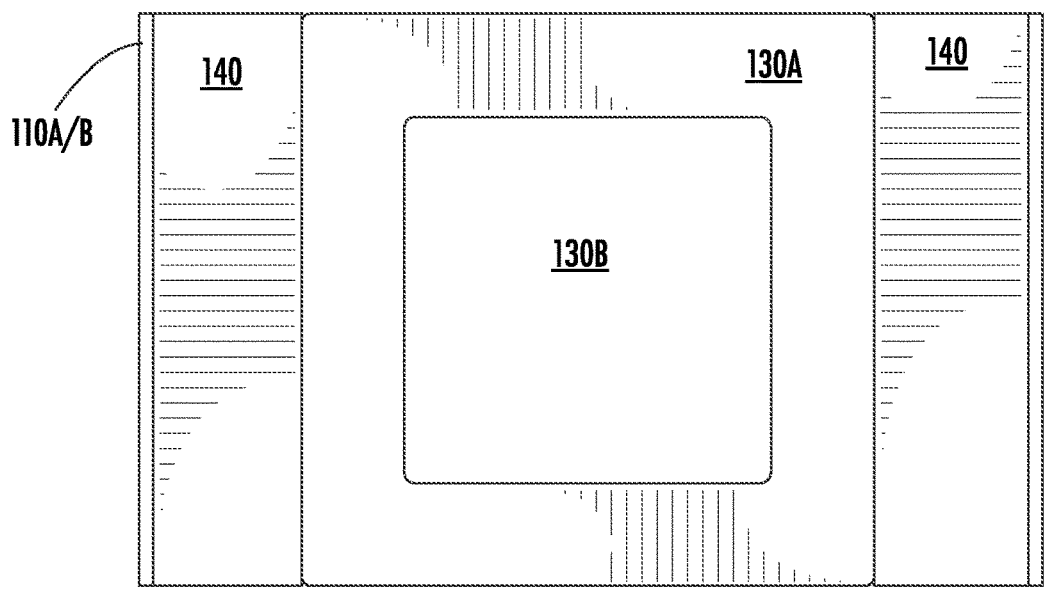
FIG. 2 is a bottom view of the adhesive applied in an example pattern on the surface of the T-bar structure of FIG. 1.

For a first example evaluation presented herein, a two-part, 3.8 W/mK thermally conductive, silicone gap filler adhesive 130 (CoolTherm® SC-1500, available from LORD Corporation), was applied within the bonding area, generally designated 134, in the first and/or second bonding regions 130A, 130B, as described in the methods disclosed herein. The adhesive in the first bonding region 130A was mixed to have a 1:1 R:H ratio and was applied on one of the T-bar structures 110A, 110B (e.g., using a handheld dispenser), which yielded a first bonding region 130A about the perimeter of the bonding area 134, such that the first bonding region 130A has a width of approximately 5-6 mm and a thickness of approximately 1 mm, as can be seen in FIG. 2. In the data shown herein for the first example embodiment (e.g., in FIGS. 5 and 6), substantially all (e.g., at least 90%, at least 95%, or at least 99%) of the volume defined by the second bonding region 130B is either left empty or filled with example second adhesives, which have a different R:H ratio (e.g., 2:1 or 1:2).

In one example specimen, a control bonding area was created by completely filling the entire bonding area 134 with CoolTherm® SC-1500 mixed at a 1:1 R:H ratio and having a thickness of approximately 1 mm. Data for this example is shown in the first row of data in the table of FIG. 5. The second and third rows of data in FIG. 5 are control specimens comprising only the resin (R) component or only the hardener (H) component, respectively, of the CoolTherm® SC-1500 applied over the entirety of the bonding area 134 at a thickness of approximately 1 mm. In another example specimen, shown in the fourth row of data in FIG. 5, the first adhesive region 130A was filled with the CoolTherm® SC-1500 mixed at a 1:1 R:H ratio and at a thickness of approximately 1 mm, with the volume between the T-bar structures 110A, 110B in the second adhesive region 130B being empty, or filled with ambient air. In another example specimen, shown in the fifth bar plotted on the bar chart of FIG. 5 and in the fifth row of data in FIG. 5, the first adhesive region 130A was filled with the CoolTherm® SC-1500 mixed at a 1:1 R:H ratio and at a thickness of approximately 1 mm, with the second adhesive region 130B being filled with the CoolTherm® SC-1500 mixed at a 2:1 R:H ratio and at a thickness of approximately 1 mm. In another example specimen, shown in the sixth row of data in FIG. 5, the first adhesive region 130A was filled with the CoolTherm® SC-1500 mixed at a 1:1 R:H ratio and at a thickness of approximately 1 mm, with the second adhesive region 130B being filled with the CoolTherm® SC-1500 mixed at a 1:2 R:H ratio and at a thickness of approximately 1 mm.

After the adhesives or, in the controls in which only the resin or only the hardener, were applied over the portions of the bonding area 134 as described immediately hereinabove, the T-bar structure 110B on which no adhesive was applied was positioned over the T-bar structure 110A on which the adhesive(s) and/or resin or hardener were applied such that the T-bar structures 110A, 110B were substantially aligned with each other in the length and width direction, and the T-bar structures 110A, 110B were compressed together until the spacers 140 positioned at each longitudinal end of the bonding area 134 were in contact (e.g., direct contact) with the surfaces of the T-bar structures 110A, 110B to form the desired bond line thickness from the adhesive(s) applied within the bonding area 134.

Figure 4:
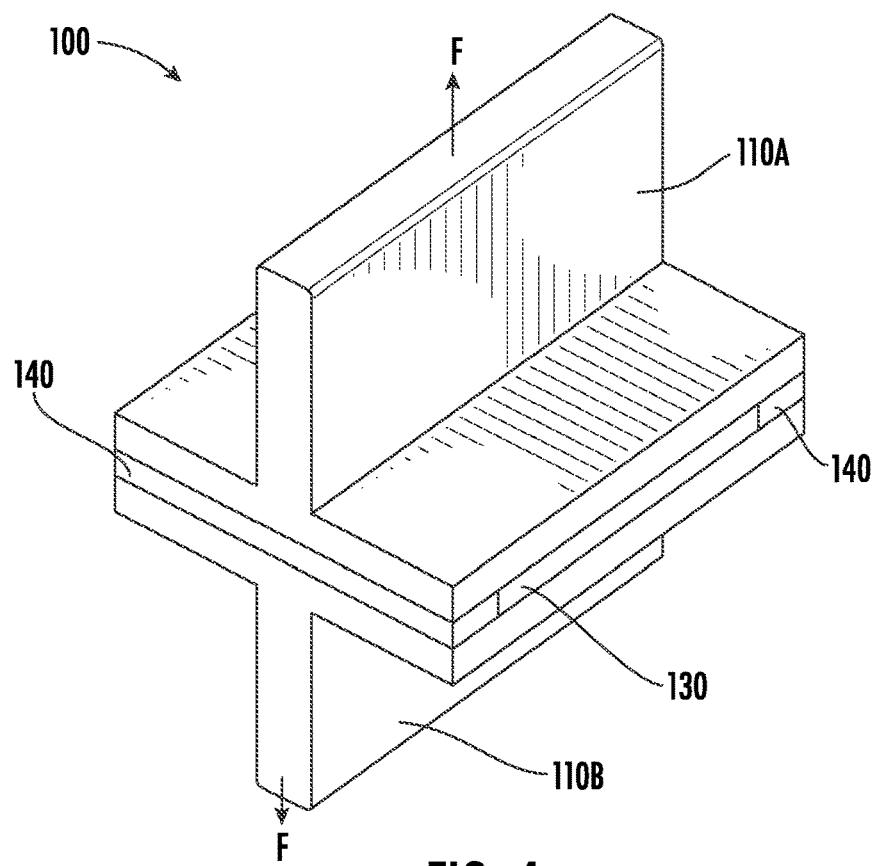
FIG. 4 is a perspective view of a test apparatus, in which the t-bar structure shown in FIG. 1 is bonded to a surface of a second T-bar structure to measure pull-off forces applied to the T-bar structures during separation of the first and second T-bar structures.

When the T-bar structures 110A, 110B are compressed together, any excess material (e.g., first adhesive, resin, and/or hardener) that is greater in volume than the volume between the T-bar structures 110A, 110B within the bonding area 134 exudes from (e.g., is squeezed) the sides (e.g., in the width direction) of the volume defined by the bonding area 134. The testing apparatus 100 was then cured for 1 hour at approximately 100° C. (e.g., +/−5° C., accounting for variances in heating devices, such as ovens, which are generally thermostatically controlled to maintain a temperature within a tolerance range). After being cured, the exposed perimeter of the first bonding region 130A was trimmed (e.g., using a razor blade) to remove any adhesive material that was exuded from the volume defining the adhesive bondline, producing a first bonding region 130A that has substantially similar (e.g., within 10%, within 5%, within 1%) external dimensions as the bonding area 134 between the spacers 140 and defined by a width of the T-bar structures 110A, 110B, but allowing for the adhesive within the first bonding region 130A to have dimensions that are smaller than the dimensions of the bonding area 134, such as, for example, at the corners thereof, as shown in FIG. 4.

The pull-off stress data shown in FIG. 5 was produced by positioning the testing apparatus 100 within a test frame and applying a tensile force of increasing magnitudes to pull the T-bar structures 110 apart, thereby breaking the adhesive bondline within the bonding area 134, as the T-bar structures 110A, 110B are separated from each other. In the example test data shown herein, an Instron® 5969 was equipped with a 1 kiloNewton (kN) load cell and was set at a displacement speed of 12 mm/min. The maximum pull-off force recorded during the separation of the T-bar structures 110A, 110B was recorded for each specimen prepared using a testing apparatus 100, as shown in FIGS. 1-4. The maximum pull-off force was divided by the surface area of the bonding area 134 (e.g., 25.4 mm×25.4 mm) to calculate the maximum pull-off stress. A minimum of 5 measurements were made for each specimen described herein.

The pull-off stresses determined from the 6 specimens evaluated are listed in the table shown in FIG. 5, along with the mode of failure (i.e., adhesive, cohesive (coh), and thin layer cohesive (tlc)) of the adhesive. As used herein, adhesive failure is when the adhesive cleanly debonds from one of the substrates, leaving no residue on the debonded surface of the substrate. Cohesive failure mode is a distinct failure mode within the adhesive material, in which portions of the adhesive material remain stuck on both sides of the adhesive bond (e.g., on both substrates). A thin-layer cohesive failure mode is denoted by the fact that there is no distinct failure noted within the material, but a thin layer of the adhesive material remains on one substrate, with the majority (e.g., 90% or more by weight) of the adhesive material remaining on the other substrate.

In the first example SC-1500 specimen, CoolTherm® SC-1500 having a 1:1 R:H ratio was applied to cover the entire bonding area 134 of the T-bar structures 110A, 110B at a thickness of approximately 1.0 mm. In the first example SC-1500 specimen, it was determined to require, on average, 0.24 MegaPascal (MPa) of pressure (pull-off stress) to cause the adhesive to mechanically fail and separate the T-bar structures 110A, 110B along the adhesive bondline.

In the second example SC-1500 specimen, only the resin (R) component of CoolTherm® SC-1500 was applied to cover the entire bonding area 134 of the T-bar structures 110A, 110B at a thickness of approximately 1.0 mm. In the second example SC-1500 specimen, it was determined to require, on average, 0.005 megapascal (MPa) of pressure (pull-off stress) to cause the adhesive to mechanically fail and separate the T-bar structures 110A, 110B along the adhesive bondline. In the third example SC-1500 specimen, only the hardener (H) component of CoolTherm® SC-1500 was applied to cover the entire bonding area 134 of the T-bar structures 110A, 110B at a thickness of approximately 1.0 mm. In the third example SC-1500 specimen, it was determined to require, on average, 0.003 MegaPascal (MPa) of pressure (pull-off stress) to cause the adhesive to mechanically fail and separate the T-bar structures 110A, 110B along the adhesive bondline. It should be noted that the use of 100% R or 100% H as a thermal interface material (TIM) is impractical for use in a battery module-cooling plate assembly, as the 100% R or 100% H would be prone to diffusion, or being displaced out of the bondline, thereby compromising thermal performance.

In the fourth example SC-1500 specimen, CoolTherm® SC-1500 having a 1:1 R:H ratio was applied only within a first bonding region 130A of the bonding area 134 (e.g., within the perimeter of the bonding area 134) at a width of about 5-6 mm at a thickness of approximately 1.0 mm, with the second bonding region 130B (e.g., the remaining surface area of the bonding area 134) being empty (e.g., filled with ambient air). In this fourth example SC-1500 specimen, the pull-off stress was determined to be, on average, about 0.14 MPa, a reduction of approximately 41.7% compared to the first example SC-1500 specimen.

In the fifth example SC-1500 specimen, CoolTherm® SC-1500 having a 1:1 R:H ratio was applied only within a first bonding region 130A of the bonding area 134 (e.g., within the perimeter of the bonding area 134) at a width of about 5-6 mm at a thickness of approximately 1.0 mm. CoolTherm® SC-1500 having a 2:1 R:H ratio was applied only within the second bonding region 130B (e.g., the remaining surface area of the bonding area 134), also at a thickness of approximately 1.0 mm. In this fifth example SC-1500 specimen, the pull-off stress was determined to be, on average, about 0.12 MPa, a reduction by approximately 50% compared to the first example SC-1500 specimen.

In the sixth example SC-1500 specimen, CoolTherm® SC-1500 having a 1:1 R:H ratio was applied only within a first bonding region 130A of the bonding area 134 (e.g., within the perimeter of the bonding area 134) at a width of about 5-6 mm at a thickness of approximately 1.0 mm. CoolTherm® SC-1500 having a 1:2 R:H ratio was applied only within the second bonding region 130B (e.g., the remaining surface area of the bonding area 134), also at a thickness of approximately 1.0 mm. In this sixth example SC-1500 specimen, the pull-off stress was determined to be, on average, 0.46 MPa. It is thought that the result in which the sixth example SC-1500 specimen demonstrated a pull off-stress higher than the first example SC-1500 specimen is due to the increased proportion of the hardener (R:H ratio of 1:2) contained within the second bonding region 130B in the sixth example SC-1500 specimen, such that the adhesive in the second bonding region 130B is harder (OO85) than the adhesive (R:H of 1:1, OO80) within the first bonding region 130A in the sixth example SC-1500 specimen, unlike in either the first or fifth example SC-1500 specimens.

Figure 6A:
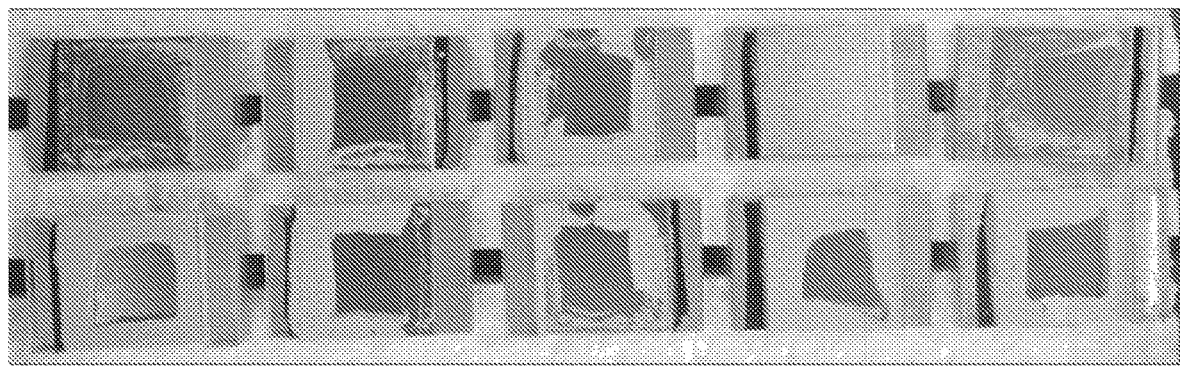
FIGS. 6A-6D show remnants of various formulations and/or arrangements of adhesive materials at the bonding surfaces between the T-bar structures shown in FIG. 4.
Figure 6B:
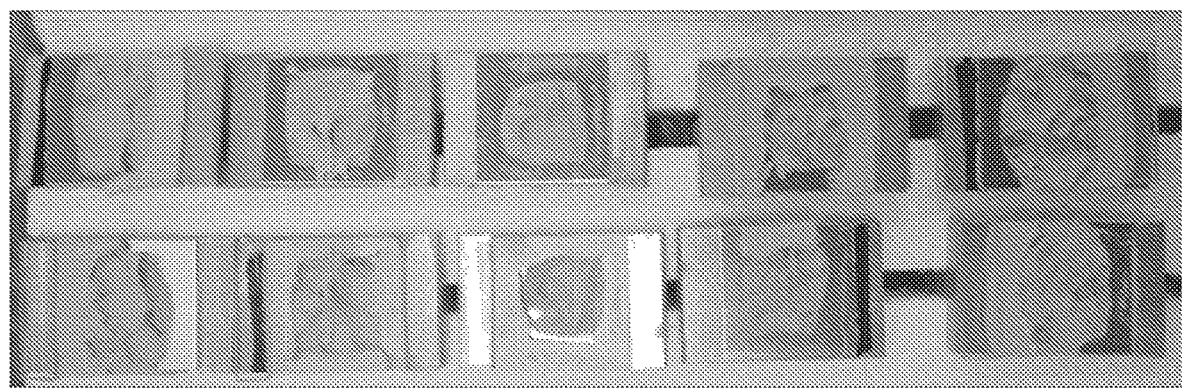
Figure 6C:
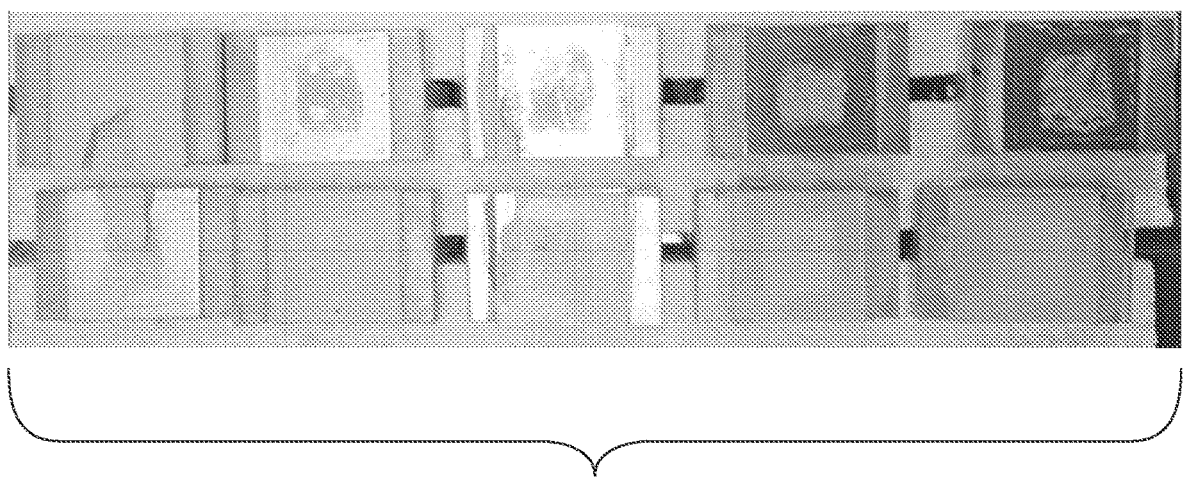
Figure 6D:
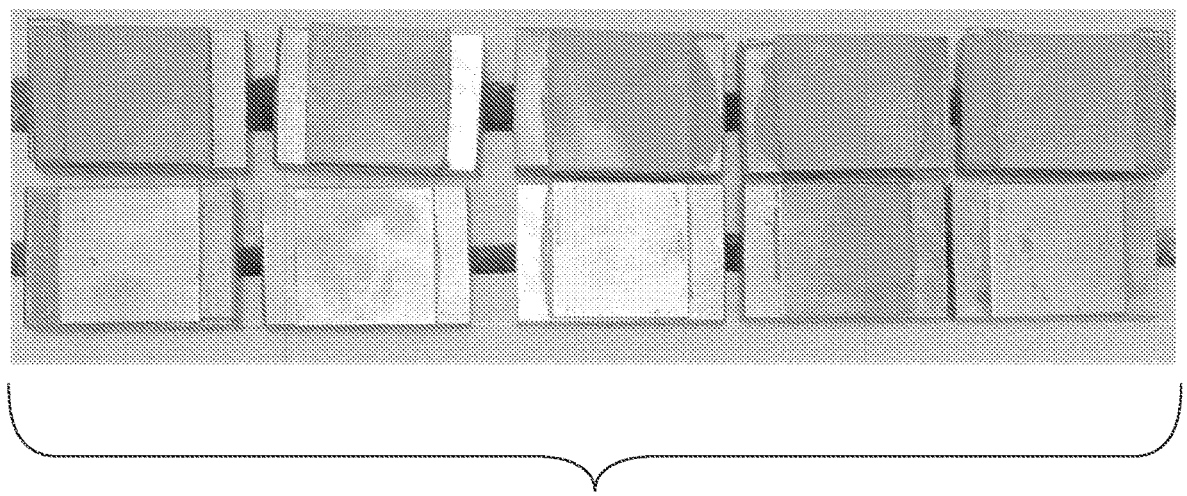
Figure 7:
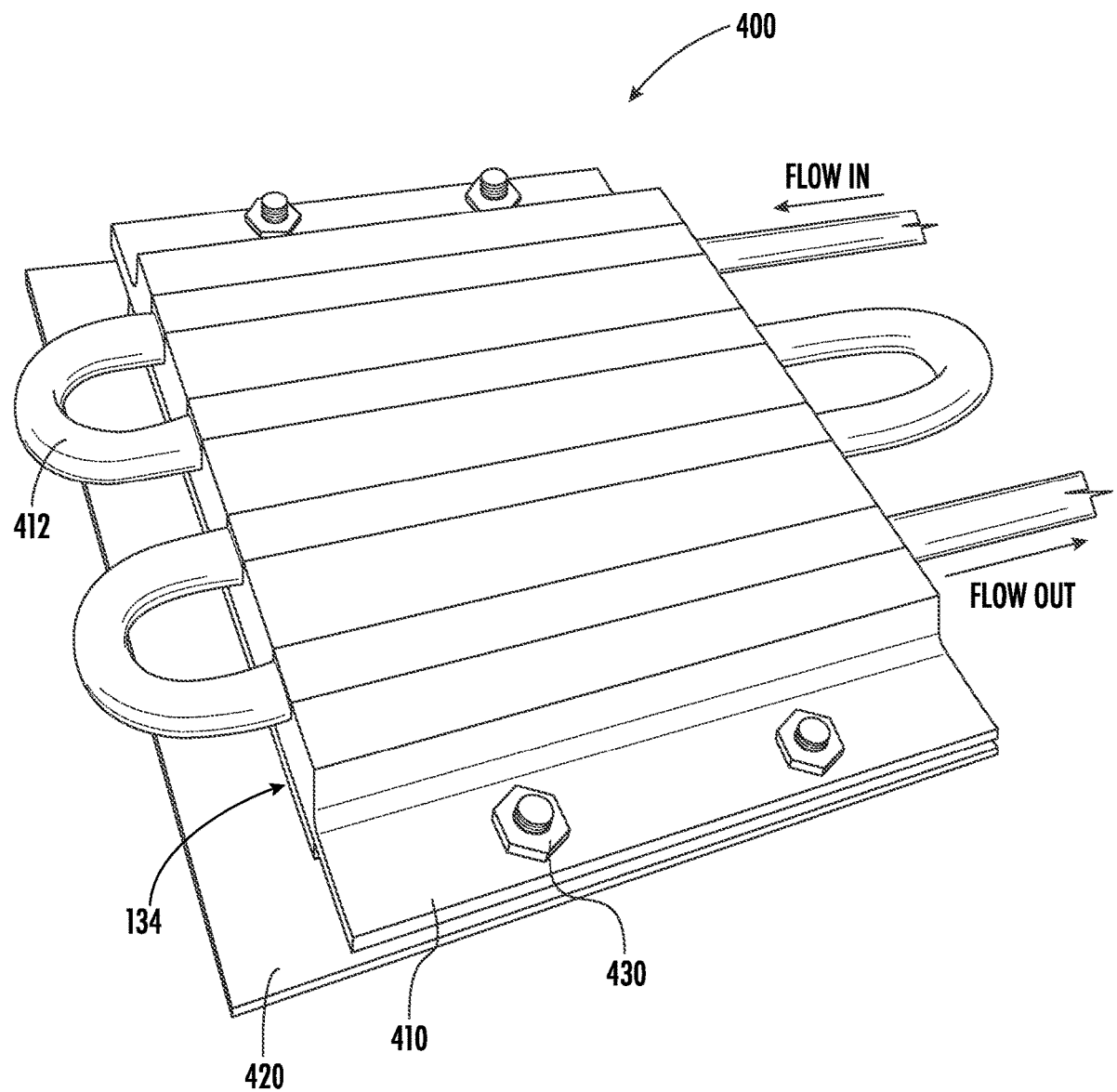
FIG. 7 shows a perspective view of an example embodiment of a heating apparatus configured to cyclically heat and cool the adhesive material.

FIGS. 6A-6D show images of the remnant adhesive on the respective T-bar structures 110A, 110B after the T-bar structures 110A, 110B have been forcibly separated (e.g., after they were pulled in tension with a pull-off force equal to, or greater than, the pull-off force necessary to cause mechanical failure of the adhesive bondline). As can be seen in FIG. 6A, in which the fourth specimen is shown primarily exhibits a thin layer cohesive failure mode. In contrast, the fifth specimen exhibits both thin layer cohesive failure and cohesive failure modes, which can be seen in FIG. 6B. It is thought that this combination of thin layer cohesive failure and cohesive failure modes results from the adhesive within the second bonding region 130B, due at least in part to its 2:1 R:H ratio, not curing completely and remaining at least in part as a viscous fluid. The sixth specimen can be seen in FIG. 6C as predominantly exhibiting a thin layer cohesive failure mode, which is generally similar to the failure mode shown in FIG. 6A for the fourth specimen. The first example SC-1500 specimen can be seen in FIG. 6D as predominantly exhibiting a thin layer cohesive failure mode, which is generally similar to the failure mode shown in FIGS. 6A and 6C for the fourth and sixth example SC-1500 specimens, respectively.

Figure 8:
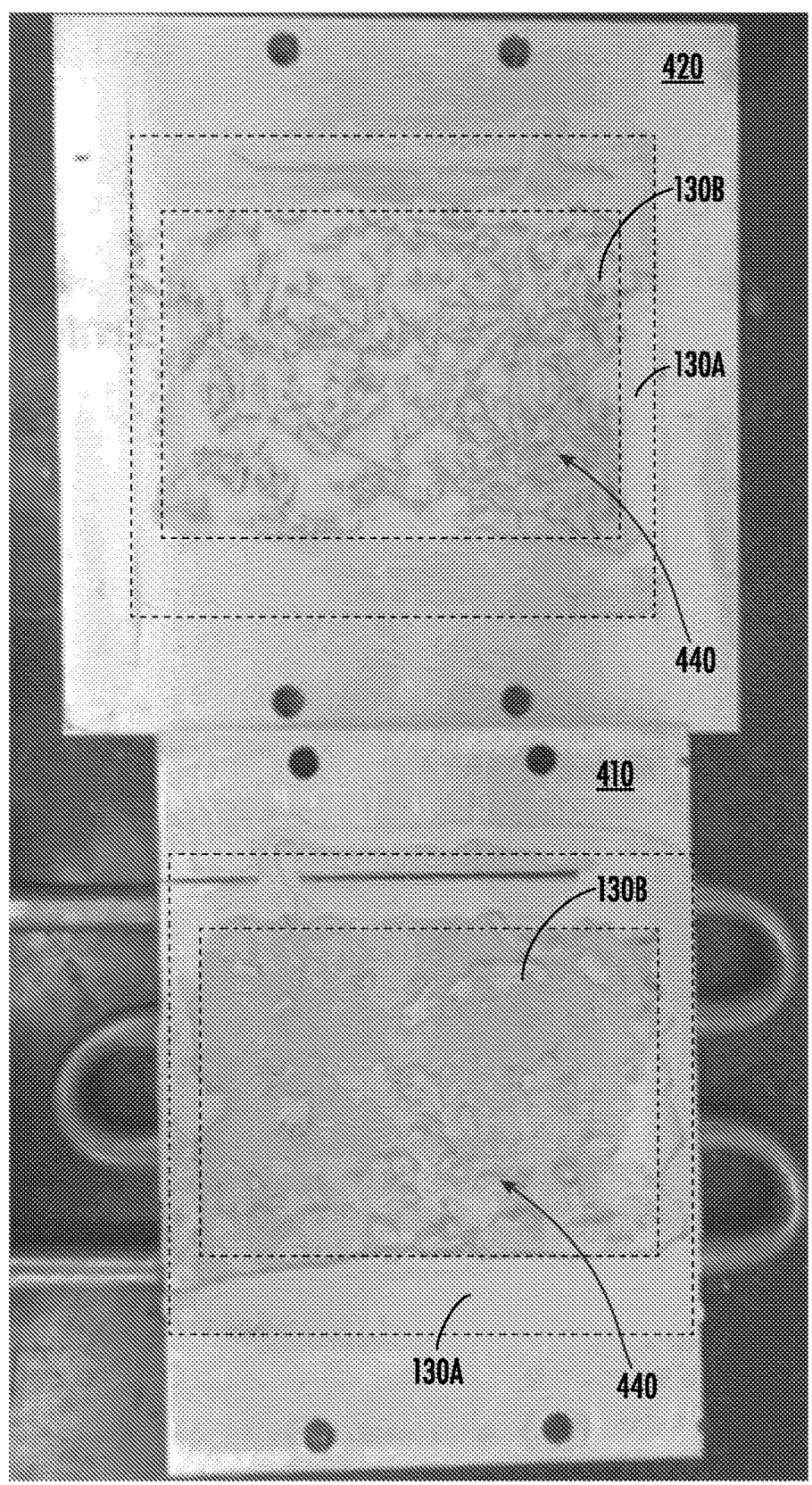
FIG. 8 shows the remnants of the adhesive material after undergoing 1000 heating/cooling cycles in the heating apparatus shown in FIG. 7.

Certain "soft" adhesive gap fillers, especially adhesive gap fillers that are lightly, or un-crosslinked, have a tendency to exude from between the T-bar structures 110A, 110B at the edges of the adhesive bondline during thermal cycling. This is referred to as "pump-out" and is a common characteristic of heat sources, such as on electric vehicles or otherwise, whether due to changes in ambient temperature, utilization rate of the heat source causing changes in heat generation, and the like. As such, the possibility of "pump-out" in the methods disclosed herein was evaluated in the thermal cycling apparatus, generally designated 400, shown in FIGS. 7 and 8, using the arrangement and application of adhesives having different R:H ratios within the first and second bonding regions 130A, 130B, according to the fifth specimen. As such, the first bonding region 130A was filled using CoolTherm® SC-1500 having a 1:1 R:H ratio and the second bonding region 130B was substantially entirely filled with CoolTherm® SC-1500 having a 2:1 R:H ratio. The adhesives were deposited within the first and second bonding regions on top of test plate 420 and a heat plate 410 was attached over the test plate 420 using fasteners 430 in a manner (e.g., using spacers) that would produce a uniform and consistent adhesive bondline between the test plate 420 and the heat plate 410. The heat plate has a fluid passage (e.g., a pipe made of a thermally conductive metal, such as copper) embedded therein to allow a fluid to pass therethrough to provide a substantially isothermal heating of the bonding area between the test plate 420 and the heat plate 410. Before beginning thermal cycle testing, the thermal cycling apparatus 100 was exposed to a curing temperature of 100° C. for at least 1 hour to cure the first and second adhesives between the test plate 420 and the heat plate 410 of the thermal cycling apparatus 400. In the thermal cycling apparatus 400 shown, the test plate 420 and the heat plate 410 are made from materials having different thermal conductivities, steel and aluminum in the thermal cycling apparatus 400 shown in FIGS. 7 and 8. The thermal cycling apparatus 400 was subjected to 1000 cycles of −40° C. to 80° C., with a dwell time of 15 minutes at each temperature, after which the test plate 420 was separated from the heat plate 410 to inspect the adhesive bondline, generally designated 440, in which uncured and/or partially cured second adhesive remains enclosed within the first bonding region, as shown in FIG. 8. Unlike known conventional thermally conductive greases, no pump-out of the adhesive is observed in the thermal cycling apparatus 400, as the adhesive applied within the bonding area 134 is substantially unchanged after thermal cycling, at least compared to the adhesive applied within the bonding area 134 before the thermal cycling test was performed. The test plate 420 and the heat plate 410 were separated to see that uncured or partially cured sample remains in the second bonding region, enclosed within the cured adhesive in the first bonding region.

A further set of example specimens was prepared using a commercially available 2-part, 2.0 W/mK thermally conductive, urethane gap filler (CoolTherm® UR-2002, available from LORD Corporation) which is formed by mixing a resin (R) component with a hardener (H) component according to a specified 1:1 R:H ratio. The urethane gap filler example specimens were prepared substantially like the silicone gap filler example specimens discussed hereinabove and which are shown and discussed regarding FIGS. 1-7B. In a first example urethane specimen of the urethane gap filler, both the first and second bonding regions 130A, 130B were filled substantially entirely with CoolTherm® UR-2002 mixed at a 1:1 R:H ratio at a thickness of approximately 1 mm. This first example urethane specimen yielded a pull-off stress of 0.25 MPa, with a 95% confidence interval of 0.02 MPa and exhibiting a cohesive bondline failure mode. In a second example urethane specimen, the first bonding region 130A was filled with CoolTherm® UR-2002 mixed at a 1:1 R:H ratio and at a width of approximately 4 mm and a thickness of approximately 1 mm, such that the first bonding region 130A comprises about 30% of the total surface area and/or volume between the T-bar structures 110A, 110B over the bonding area 134. The second bonding region 130B was filled with CoolTherm® UR-2002 mixed at a 2:1 R:H ratio and having a thickness of approximately 1 mm, such that the second bonding region 130B comprises about 70% of the total surface area and/or volume between the T-bar structures 110A, 110B over the bonding area 134. Since the urethane adhesive is applied at different R:H ratios in the first and second bonding regions 130A, 130B, a variable crosslink density and, correspondingly, variable strength is produced from the exterior to the interior of the bondline, while still maintaining a highly thermally conductive bondline. The second example urethane example yielded a pull-off stress of 0.06 MPa, with a 95% confidence interval of 0.02 MPa and exhibiting a cohesive bondline failure mode. As such, the pull-off stress was reduced by about 75% in the second example urethane specimen compared to the first example urethane specimen.

According to another example embodiment, a further set of example specimens was prepared to form a gradient gap filler by applying a commercially-available 1-component, moisture-cure silicone sealant (GE5010) within the first bonding region 130A to surround a 1-component, non-reactive (thermoplastic), 3.9 W/mK thermally conductive, silicone grease applied within the second bonding region 130B. The silicone grease applied within the second bonding region 130B comprises, by weight percentage, 13.22% vinyl terminated PDMS (20 cst), a thermoplastic resin matrix; 1.95% hydroxyl terminated PDMS (10,000 Da), a viscosity reducing surfactant; 47.75% near-spherical aluminum (approximately 10 micron in diameter), a thermally conductive filler; and 37.08% spherical zinc oxide (approximately 0.3 micron in diameter), a thermally conductive filler. The constituent components of the grease listed hereinabove were mixed together under vacuum for 1 minute at 1,200 rpm using a Hauschild DAC-800 mixer. The thermal conductivity across the bondline was measured according to ISO 22007-2, using a Hot Disk Transient Plane Source (Model 2500 S). In a first example sealant specimen, the 1-component, moisture-cure, silicone sealant is applied over the entire bonding area 134, covering substantially the entire first and second bonding regions 130A, 130B at a thickness of approximately 1 mm. This first example sealant specimen yielded a pull-off stress of 0.49 MPa, with a 95% confidence interval of 0.02 MPa and exhibiting a thin layer cohesive bondline failure mode. In a second example sealant specimen, the first bonding region 130A was filled with the 1-component, moisture-cure, silicone sealant at a width of approximately 4 mm and at a thickness of approximately 1 mm, such that the first bonding region 130A comprises about 30% of the total surface area and/or volume between the T-bar structures 110A, 110B over the bonding area 134. The second bonding region 130B was filled with the silicone grease having the constituent components mixed at the percentages provided immediately hereinabove, such that the second bonding region 130B comprises about 70% of the total surface area and/or volume between the T-bar structures 110A, 110B over the bonding area 134 and has a thickness of approximately 1 mm. The second example sealant example yielded a pull-off stress of 0.17 MPa, with a 95% confidence interval of 0.03 MPa and exhibiting a cohesive bondline failure mode. As such, the pull-off stress was reduced by about 65% in the second example sealant specimen compared to the first example sealant specimen and a majority of the bonding area is thermally conductive and capable of heat transfer between the surfaces adhesively adjoined. It should further be noted that, because the width of the first bonding region 130A will remain the same as the size of the bonding area 134 increases, the proportion of the bonding area constituted by the second bonding region 130B and, accordingly, the proportion of the bonding area that is thermally conductive, increases as the size of the bonding area 134 increases. Additionally, the failure mode for the second example sealant specimen is predominantly cohesive in nature, which is preferred from a thermal transport perspective.

According to still another example embodiment, a further set of example specimens was prepared to form a gradient gap filler by applying a commercially-available 1-component, moisture-cure urethane sealant (Loctite® PL Window Door & Siding Polyurethane Sealant) within the first bonding region 130A to surround a 1-component, non-reactive (thermoplastic), 3.7 W/mK thermally conductive, urethane grease applied within the second bonding region 130B. The urethane grease applied within the second bonding region 130B comprises, by weight percentage, 6.49% polypropylene glycol (MW 425 Daltons), a thermoplastic resin matrix; 0.96% phosphate polyester wetting agent, a viscosity reducing surfactant; 56.94% spherical aluminum oxide (70 micron average particle size, or diameter), a thermally conductive filler; 35.24% spherical aluminum oxide (7 micron average particle size, or diameter), a thermally conductive filler; and 0.37% polydimethylsiloxane treated fumed silica, a rheological thixotropic additive. The constituent components of the urethane grease listed hereinabove were mixed together under vacuum for 45 seconds at 1,200 rpm using a Hauschild DAC-800 mixer. The thermal conductivity across the bondline was measured according to ISO 22007-2, using a Hot Disk Transient Plane Source (Model 2500 S). In a first example urethane sealant specimen, the 1-component, moisture-cure, urethane sealant is applied over the entire bonding area 134, covering substantially the entire first and second bonding regions 130A, 130B at a thickness of approximately 1 mm. This first example urethane sealant specimen yielded a pull-off stress that was in excess of about 0.6 MPa, which were the test limits of the test apparatus; as such, it was not possible to determine a 95% confidence interval, nor the bondline failure mode. In a second example urethane sealant specimen, the first bonding region 130A was filled with the 1-component, moisture-cure, urethane sealant at a width of approximately 4 mm and at a thickness of approximately 1 mm, such that the first bonding region 130A comprises about 30% of the total surface area and/or volume between the T-bar structures 110A, 110B over the bonding area 134. The second bonding region 130B was filled with the urethane grease having the constituent components mixed at the percentages provided immediately hereinabove, such that the second bonding region 130B comprises about 70% of the total surface area and/or volume between the T-bar structures 110A, 110B over the bonding area 134 at a thickness of approximately 1 mm. The second example sealant example yielded a pull-off stress of 0.14 MPa, with a 95% confidence interval of 0.03 MPa and exhibiting a thin layer cohesive bondline failure mode. As such, the pull-off stress was reduced by at least more than 75% in the second example urethane sealant specimen, at least insofar as 0.14 MPa is less than 25% of the maximum stress capable of being measured by the test apparatus, 0.6 MPa. Since it is possible that the first example urethane sealant embodiment had a pull-off strength significantly greater than 0.6 MPa, it is possible that the reduction in pull-off strength for the second example urethane sealant embodiment is at least 80%, at least 90%, or even at least 95% compared to the first example sealant specimen. Furthermore, unlike in the first example urethane sealant embodiment, in the second example urethane sealant embodiment, a majority of the bonding area is thermally conductive and capable of heat transfer between the surfaces adhesively adjoined.

In considering the data presented herein for each example specimen, it should further be noted that, because the width of the first bonding region 130A will remain the same as the size of the bonding area 134 increases, the proportion of the bonding area constituted by the second bonding region 130B and, accordingly, the proportion of the bonding area that is thermally conductive, increases as the size of the bonding area increases. An example of such a configuration was evaluated by using, instead of T-bar structures 110A, 110B having a bonding area 134 of 1 inch×1 inch, bonding structures that are 12 inches in length and 6 inches in width and are bonded together by a two-part, 3.8 W/mK thermally conductive, silicone gap filler adhesive (CoolTherm® SC-1500), which is applied within the volume defined by the space over the bonding area to have a desired thickness (e.g., 1.0 mm).

In a first example scaled specimen, the SC-1500 adhesive was applied over the entire surface of the bonding area and compressed between the bonding structures to the desired thickness of approximately 1 mm, as described in the example methods disclosed herein. The adhesive in the bonding area according to the first example scaled specimen was mixed to have a 1:1 R:H ratio. Thus, in the first example scaled specimen of the silicone gap filler, both the first and second bonding regions were filled substantially entirely with CoolTherm® SC-1500 mixed at a 1:1 R:H ratio at a thickness of approximately 1 mm. This first example scaled specimen yielded a pull-off stress of 0.18 MPa and exhibited a cohesive bondline failure mode. In a second example scaled specimen, the first bonding region was filled with CoolTherm® SC-1500 mixed at a 1:1 R:H ratio and at a width of approximately 5 mm and a thickness of approximately 1 mm, such that the first bonding region comprises about 20% of the total surface area of the bonding area. The second bonding region was filled with CoolTherm® SC-1500 mixed at a 2:1 R:H ratio and having a thickness of approximately 1 mm, such that the second bonding region comprises about 80% of the total surface area of the bonding area. Since the SC-1500 is applied at different R:H ratios in the first and second bonding regions, a variable crosslink density and, correspondingly, variable strength is produced from the exterior to the interior of the bondline, while still maintaining a highly thermally conductive bondline. The second example scaled specimen yielded a pull-off stress of 0.03 MPa and exhibited a cohesive bondline failure mode. As such, the pull-off stress was reduced by about 83% in the second example scaled specimen compared to the first example scaled specimen.

What is claimed is:

1. A method for adhesively bonding a first substrate to a second substrate to reduce pull-off stress during separation of the first and second substrates, the method comprising:
applying a first adhesive to a first bonding region of a bonding area of the first substrate;
applying a second adhesive, which has an adhesive strength that is lower than an adhesive strength of the first adhesive, to a second bonding region of the bonding area of the first substrate;
pressing the first substrate against the second substrate; and
forming an adhesive bondline comprising the first and second adhesives between the first and second substrates;
wherein:
the first substrate comprises a heat source and the second substrate comprises a heat sink; or
the second substrate comprises a heat source and the first substrate comprises a heat sink.

2. The method of claim 1, wherein:
the first and second adhesives comprise a same two-part adhesive formulation; and
the first adhesive has a R:H (resin to hardener) ratio that is different from the second adhesive.

3. The method of claim 2, wherein the first adhesive has a greater degree of crosslinking than the second adhesive.

4. The method of claim 3, wherein the second adhesive comprises an uncrosslinked material.

5. The method of claim 3, wherein the greater degree of crosslinking is due to the R:H ratio being different for the first and second adhesives.

6. The method of claim 2, wherein the R:H ratio of the first adhesive comprises a relatively greater proportion of hardener than the R:H ratio of the second adhesive, which comprises a relatively greater proportion of resin than the R:H ratio of the first adhesive.

7. The method of claim 1, wherein:
the first bonding region of the bonding area is a perimeter of the bonding area; and
the second bonding region of the bonding area is located within, and bounded by, the perimeter formed by the first bonding region, such that the second adhesive at least partially fills a volume within the perimeter.

8. The method of claim 7, wherein the second adhesive completely fills the volume between the first and second substrates in the second bonding region.

9. The method of claim 7, wherein the first adhesive forms a continuous and uninterrupted layer around the perimeter of the bonding area.

10. The method of claim 1, wherein:
the second bonding region of the bonding area is a perimeter of the bonding area; and
the first bonding region of the bonding area is located within, and bounded by, the perimeter formed by the second bonding region, such that the first adhesive at least partially fills a volume within the perimeter.

11. The method of claim 10, wherein the first adhesive completely fills the volume between the first and second substrates in the first bonding region.

12. The method of claim 10, wherein the second adhesive forms a continuous and uninterrupted layer around the perimeter of the bonding area.

13. The method of claim 1, comprising separating the first substrate from the second substrate by breaking the adhesive bondline formed by the first and second adhesives, wherein, due to the lower adhesive strength of the second adhesive, a pull-off stress required to separate the first and second substrates is less than a pull off stress that would be needed to separate the first and second substrates if an entirety of the bonding area were covered by the first adhesive.

14. The method of claim 13, wherein the adhesive strength of the first and second adhesives is correlated to the pull-off stress required to separate the first substrate from the second substrate.

15. The method of claim 1, wherein at least one of the first adhesive and the second adhesive comprise at least one of a urethane, silicone, acrylic, and epoxy-based material.

16. The method of claim 1, wherein the heat source comprises a battery module and/or the heat sink comprises a cooling plate.

17. The method of claim 1, wherein the heat source comprises a battery module configured to supply power to an electric vehicle.

18. The method of claim 1, wherein the heat source comprises a microprocessor and the heat sink comprises a lid and/or heat spreader.

19. The method of claim 1, wherein at least one of the first adhesive and the second adhesive comprise a thermally conductive filled resin composition.

20. The method of claim 1, wherein at least one of the first adhesive and the second adhesive comprise a thermally conductive gap filler adhesive.

21. The method of claim 1, comprising irradiating at least a portion of the first adhesive with a light source comprising ultraviolet (UV) light to depolymerize at least the portion of the first adhesive that is exposed to the light source, such that the adhesive strength of the first adhesive decreases, relative to the adhesive strength of the first adhesive prior to exposure to the light source.

22. The method of claim 1, comprising, after the first and/or second adhesives have been cured, exposing the first and second adhesives to a temperature above a predetermined softening temperature to decrease the adhesive strength of at least the first adhesive, wherein one of the first and second substrates comprises a heat source, and wherein the softening temperature is within an operating temperature of the heat source.

23. A system for adhesively bonding a first substrate to a second substrate to reduce pull-off stress during separation of the first and second substrates, the system comprising:
a first adhesive applied over a first bonding region of a bonding area of the first substrate; and
a second adhesive, which has an adhesive strength that is lower than an adhesive strength of the first adhesive, applied over a second bonding region of the bonding area of the first substrate;
wherein the system is configured such that the first and second substrates are pressed against each other to form an adhesive bondline comprising the first and second adhesives between the first and second substrates; and
wherein:
the first substrate comprises a heat source and the second substrate comprises a heat sink; or
the second substrate comprises a heat source and the first substrate comprises a heat sink.

24. The system of claim 23, wherein:
the first and second adhesives comprise a same two-part adhesive formulation; and
the first adhesive has a R:H (resin to hardener) ratio that is different from the second adhesive.

25. The system of claim 24, wherein the first adhesive has a greater degree of crosslinking than the second adhesive.

26. The system of claim 25, wherein the second adhesive comprises an uncrosslinked material.

27. The system of claim 25, wherein the greater degree of crosslinking is due to the R:H ratio being different for the first and second adhesives.

28. The system of claim 24, wherein the R:H ratio of the first adhesive comprises a relatively greater proportion of hardener than the R:H ratio of the second adhesive, which comprises a relatively greater proportion of resin than the R:H ratio of the first adhesive.

29. The system of claim 23, wherein:
the first bonding region of the bonding area is a perimeter of the bonding area; and
the second bonding region of the bonding area is located within, and bounded by, the perimeter formed by the first bonding region, such that the second adhesive at least partially fills a volume within the perimeter.

30. The system of claim 29, wherein the second adhesive completely fills the volume between the first and second substrates in the second bonding region.

31. The system of claim 29, wherein the first adhesive forms a continuous and uninterrupted layer around the perimeter of the bonding area.

32. The system of claim 23, wherein:
the second bonding region of the bonding area is a perimeter of the bonding area; and
the first bonding region of the bonding area is located within, and bounded by, the perimeter formed by the second bonding region, such that the first adhesive at least partially fills a volume within the perimeter.

33. The system of claim 32, wherein the first adhesive completely fills the volume between the first and second substrates in the first bonding region.

34. The system of claim 32, wherein the second adhesive forms a continuous and uninterrupted layer around the perimeter of the bonding area.

35. The system of claim 23, wherein an adhesive strength of the adhesive bondline is lower than an adhesive strength of an adhesive bondline formed entirely from only the first adhesive or only the second adhesive.

36. The system of claim 35, wherein the first and second adhesives are mixed together, at least partially, when the first substrate is pressed against the second substrate.

37. The system of claim 35, wherein:
the system is configured for separating the first substrate from the second substrate by breaking the adhesive bondline formed by the first and second adhesives; and
since the adhesive strength of the adhesive bondline is lower than an adhesive strength of an adhesive bondline formed entirely from only the first adhesive or only the second adhesive, a pull-off stress required to separate the first and second substrates is less than a pull-off stress that would be needed to separate the first and second substrates if an entirety of the bonding area were covered by only the first adhesive or only the second adhesive.

38. The system of claim 23, wherein at least one of the first adhesive and the second adhesive comprise at least one of a urethane, silicone, acrylic, and epoxy-based material.

39. The system of claim 23, wherein the heat source comprises a battery module and/or the heat sink comprises a cooling plate.

40. The system of claim 23, wherein the heat source comprises a battery module configured to supply power to an electric vehicle.

41. The system of claim 23, wherein the heat source comprises a microprocessor and the heat sink comprises a lid and/or heat spreader.

42. The system of claim 23, wherein at least one of the first adhesive and the second adhesive comprise a thermally conductive filled resin composition.

43. The system of claim 23, wherein at least one of the first adhesive and the second adhesive comprise a thermally conductive gap filler adhesive.

44. The system of claim 23, wherein:
the system is configured for separating the first substrate from the second substrate by breaking the adhesive bondline formed by the first and second adhesives; and
due to the lower adhesive strength of the second adhesive, a pull-off stress required to separate the first and second substrates is less than a pull off stress that would be needed to separate the first and second substrates if an entirety of the bonding area were covered by the first adhesive.

45. The system of claim 23, wherein the adhesive strength of the first and second adhesives is correlated to the pull-off stress required to separate the first substrate from the second substrate.

46. The system of claim 23, wherein at least a portion of the first adhesive is configured, upon being irradiated with a light source comprising ultraviolet (UV) light, to depolymerize at least the portion of the first adhesive that is exposed to the light source, such that the adhesive strength of the first adhesive decreases, relative to the adhesive strength of the first adhesive prior to exposure to the light source.

47. The system of claim 23, wherein:
the system is configured, after the first and/or second adhesives have been cured, when exposed to a temperature above a predetermined softening temperature, to decrease the adhesive strength of at least the first adhesive;
one of the first and second substrates comprises a heat source; and
the softening temperature is within an operating temperature of the heat source.

48. A system for adhesively bonding a first substrate to a second substrate to reduce pull-off stress during separation of the first and second substrates, the system comprising:
a first adhesive applied over a first bonding region of a bonding area of the first substrate; and
a second adhesive, which has an adhesive strength that is lower than an adhesive strength of the first adhesive, applied over a second bonding region of the bonding area of the first substrate;

wherein the system is configured such that the first and second substrates are pressed against each other to form an adhesive bondline comprising the first and second adhesives between the first and second substrates;

wherein one of the first and second substrates comprises a heat source;

wherein the system is configured, after the first and/or second adhesives have been cured, when exposed to a temperature above a predetermined softening temperature, to decrease the adhesive strength of at least the first adhesive; and wherein the softening temperature is within an operating temperature of the heat source.

\* \* \* \* \*